Patented Oct. 19, 1954

2,692,245

UNITED STATES PATENT OFFICE 2,692,245

COMPOSITIONS DISPERSIBLE IN AQUEOUS MEDIA COMPRISING RUBBERY POLYMERS, TACKIFYING RESINS, AND METHYL CELLULOSE

James H. Groves, Oak Park, and Daniel J. Lenane, Maywood, Ill., assignors to American Can Company, New York, N. Y., a corporation of New Jersey No Drawing. Application November 17, 1950, Serial No. 196,358

6 Claims. (Cl. 260—3)

This invention relates to a method of dispersing rubbery polymers and to the composition resulting therefrom and more specifically refers to a method of dispersing solid or dry natural and synthetic rubbery polymers in water, using methyl cellulose as a dispersing agent and to stable water dispersions of such rubbery materials which, on drying, are resistant to redispersion by hot water or steam.

An object of the invention is the provision of a method of dispersing rubbery solids in water without the use of alkali soaps.

Another object is the provision of a method of dispersing solid rubbery materials in water, using methyl cellulose as a dispersing agent.

Another object is the provision of a sealing or gasket or coating composition comprising a mixture of a rubbery polymer, filler, a tackifying agent and methyl cellulose dissolved and dispersed in water free of alkali soaps.

Another object is the provision of a sealing or gasket or coating composition having excellent resistance to hot water and fat.

Numerous other objects and advantages of the invention will be apparent as it is better understood from the following description which is a preferred embodiment thereof.

Water dispersions of rubbery polymers heretofore were made by working the polymer with an alkali soap solution until the particle size of the rubbery material was sufficiently small to remain in suspension. In most instances addition of a protective colloid such as protein is needed to keep the particles in a colloidal state. Natural rubber latex must be protected with an alkali soap to prevent coagulation. The naturally occurring proteinaceous materials also serve as protective colloids to retard coagulation of the rubber particles.

Sealing or gasket compounds for ends of containers or container joints formed by mixing a solution of high viscosity methyl cellulose and a natural latex or synthetic rubber dispersion are old in the art, as disclosed in Nagle et al., Patent No. 2,427,613. Methyl cellulose is unique in its solubility behavior in that it is fairly soluble in cold water but gels on heating. Nagle et al. employed this property in an attempt to provide a composition that was resistant to moist heat. However, this was unsuccessful for the reason that although the methyl cellulose would coagulate when subjected to moist heat of about 120° F. or above, the soaps, proteins or other protective colloids in the sealing composition are reactivated when exposed to such conditions, so that at least a partial dispersion of the rubbery materials is effected and thus the sealing qualities of the lining are seriously impaired.

Canning practices developed in recent years require a sealing effectiveness at temperatures ranging from about 190° F. to about 212° F. or even higher in some cases. In addition to being resistant to moist heat, the compound in many instances must also be resistant to animal and vegetable fats and to certain petroleum products. In the past, if one of these resistant characteristics was obtained, it was at the expense of the other. Thus, organic solvent dispersions possess good resistance to moist heat but do not have adequate fat resistance, and water dispersions are normally fat resistant but lack proper resistance to moist heat. We discovered that the compositions or our invention possess resistant qualities to both fats and moist heat and that the viscosity is stable over long periods of storage and also that they are not thixotropic.

The method of forming the dispersions comprises blending a solid or dry, rubbery polymer, either natural or synthetic, with fillers, a tackifying resin, methyl cellulose and water. The temperature at which phase inversion from a water in rubber-filler-resin mixture to a rubber-filler-resin in water colloid takes place must be below the gel point of the methyl cellulose.

The dispersion can be made by several variations of incorporating the methyl cellulose into the composition.

1. A rubbery polymer, natural, synthetic or a compatible combination thereof is worked for a few minutes on a roll mill, in a Banbury or a Baker-Perkins mixer. Inert filler, pigment, other solid additives and dry methyl cellulose are added in increments with continued mixing until the ingredients are distributed fairly evenly. If a roll mill or Banbury mixer is used to blend the solid ingredients, the mixture is transferred to a Baker-Perkins mill at this point. The usual caution not to overheat the dry stock during the mixing operation must be exercised.

A tackifying resin in solution in a volatile organic solvent is slowly added. The preferred resin solvents are those which are also solvents or softening or swelling agents for the rubbery polymer. The resin is then thoroughly mixed with the remaining ingredients. Water is added in small increments and the entire mixture is worked or mixed until the moisture is fairly completely absorbed before a subsequent addition of water is made. The mixing procedure produces a considerable amount of frictional heat which is usually more than ample to evaporate all the volatile organic resin solvent before much water has been added. After the removal of the solvent by evaporation, the mixture is cooled below the gelling temperature of the methyl cellulose and maintained below such temperature during the remainder of the time that water is being incorporated into the composition. The cooling can be effected by circulating a cooling liquid through a jacket of the mixer, by adding finely shaved ice in place of liquid water, or, preferably, by adding crushed solid carbon dioxide. Obviously, the temperature must not be permitted to drop below the freezing point of the water. A temperature range of from about 35° F. to about 75° F. is preferred, but it can go as high as about 120° F. without adverse results if the water additions are made with sufficient caution.

In the early stages of water addition a colloidal dispersion or solution of water in the rubber-filler-resin mixture is formed. When a water concentration of from about 18 to about 23 per cent by weight of compound is reached, there is a fairly rapid phase inversion, so that water becomes the continuous phase and the rubber-filler-resin mixture is the disperse phase. At this point caution must be used and water must be added with great care to prevent coalescence of particles. Otherwise, agglomeration may become so great that sedimentation may occur when the compound is diluted to proper lining concentrations and viscosity. When a water concentration of about 40% is reached, the dispersion is removed from the Baker-Perkins mill and subjected to rapid stirring to break up agglomerates. While stirring, water is also added to the desired solids concentration. The water addition requires from about 20 minutes to about an hour, depending on the ease of dispersibility of the polymer, the size of the batch being prepared and the efficiency of mixing.

Among the rubbery polymers that can be used are natural rubber, neoprene, butylene polymers, isobutylene polymers, butadiene-styrene copolymers, copolymers of butadiene and acrylonitrile and copolymers of butadiene, styrene and acrylonitrile. Butadiene-styrene copolymers having a butadiene content of from about 50% to about 95% and a styrene content of from about 5% to about 50% were successfully dispersed. The butadiene-acrylonitrile copolymers can contain from 15% to 45% acrylonitrile and the remainder butadiene. Any natural or synthetic rubbery polymer can be dispersed by this method.

The fillers which are suitable are various clays such as hard and soft types kaolins, aluminum silicate, buca clay, calcium carbonate, diatomaceous earth, and zinc oxide. The last is preferred because it has a reenforcing effect on rubbery polymers which is not possessed by the clays. Other fillers can be used providing they themselves do not act as water-dispersing agents with respect to rubber. These can be used singly or in any combination.

As tackifying resins, zinc salts of rosin, hydrogenated rosin and partially esterified rosin or hydrogenated rosin are preferred. Beta-pinene and other pinene polymers, coumarone-indene polymers and organic solvent soluble phenol aldehyde resin, phenol cashew nut oil resins and aldehyde cashew nut oil resins capable of being converted catalytically to insoluble resins are also useful. Any resin which has adhesive qualities and which is compatible with rubber and soluble in a rubber softening or swelling solvent is useful. It is desirable that the melting point of such tackifying resin be above 212° F. or else that it be capable of conversion to attain such characteristics, so that it would not melt when exposed to the temperature of steam at atmosphere pressure. The resins can be used singly or in any compatible combination. If desired the tackifying agents can be omitted entirely.

Solvents for resinous tackifiers and rubber softeners are Skellysolve B, which is a petroleum fraction having a boiling range of 140°–160° F., Skellysolve C, another petroleum fraction with a boiling range of 186° to 212° F., methyl ethyl ketone, methyl isopropyl ketone or any other relatively low boiling organic solvent capable of dissolving the tackifying resin and softening the rubbery polymer.

Methyl cellulose may be in the form of linters or powder and the useful types have viscosity grades ranging from 100 to 1500 centipoises. Blends of the various grades are satisfactory. In general a slightly higher concentration of low viscosity grade methyl cellulose is required than of the high viscosity to effect dispersion of a given polymer.

Other additives are desirable but not necessary. From 0.3 to 1.0% of an antioxidant, such as Age Rite White, which is symmetrical di-beta-naphthyl-paraphenylenediamine, can be used. Other well known rubber antioxidants may be substituted. Pigments, such as titanium dioxide and carbon black in concentrations up to 8.0 and 0.15% respectively, are also of value to facilitate inspection of lined container ends, but they may be omitted if a clear film is desired.

Several other methods, hereinafter described, can be used to incorporate the methyl cellulose into the mixtures to form a water dispersion of a rubbery polymer. In all these methods the ingredients mentioned heretofore have exactly the same use and function and the phase inversion takes place at concentrations of about 18% to 23% water. The only essential ingredients are the rubbery polymer, methyl cellulose and an aqueous medium. The aqueous medium can consist of water alone, of methyl cellulose in water solution, of an emulsion of methyl cellulose, water and a volatile organic solvent for the tackifying resin, or an emulsion of methyl cellulose, water, resin solvent and tackifying resin.

2. Another method is to blend the rubbery polymer, and filler, anti-oxidant and pigment, if desired. These solids may be worked on a roll mill or in a Banbury mixer. After the ingredients are fairly well distributed they are transferred to a Baker-Perkins mixer, and cooled to a temperature below the gelation point of methyl cellulose. A water solution of methyl cellulose is added to the solids in increments with continued mixing. Slow cautious additions of methyl cellulose solution are made and the temperature of the mix is controlled, until a permanent phase inversion occurs. At such time the rubber, and other non-soluble solids if added, are finely dispersed in the water and remain in suspension, after dilution, to a total solids content of 15 per cent.

A portion of the methyl cellulose can be mixed in with the solid ingredients on a roll mill and the remainder added as a water solution, or all the methyl cellulose can be worked into the rubber and water added slowly.

3. The incorporation of the methyl cellulose into the solid ingredients can be made by first blending rubber and other optional solids, such as inert fillers, anti-oxidant and tackifying resins.

This blend of solids is then transferred to a Baker-Perkins mixer. A suspension of dry methyl cellulose, in a volatile organic solvent which dissolves the resin and swells the rubbery polymer, is added to the solids blend. The resultant mixture is worked for a few minutes to distribute the methyl cellulose, swell the rubber and dissolve the resin. If the temperature is too high the mixture is cooled below 120° F. and the water is added in increments, with thorough mixing between each such addition. The organic solvent evaporates during the mixing period and eventually is essentially removed from the mixture. Continued slow additions of water in small increments results in a permanent phase inversion in which the solids are dispersed in the aqueous medium. If desired a portion of the methyl cellulose can be incorporated as a suspension in a volatile organic solvent and the remainder added as a water solution.

4. The rubbery polymer, to which may be added optionally a filler, a tackifying resin and other additives, is dissolved or dispersed in a volatile organic solvent. This solution or dispersion is placed in a Baker-Perkins mixer and the volatile organic solvent is evaporated with the simultaneous addition of dry methyl cellulose and very small amounts of water. The entire mass is mixed during this phase of the procedure. When the organic solvent is completely removed the temperature is adjusted and maintained below the gelation point of the methyl cellulose. Mixing is continued and additional water is added if necessary to invert the colloidal phase. A portion of the methyl cellulose can be added in the dry state as described and the remainder added as a water solution, and the same end results will be obtained.

5. A mixture of rubber polymer, filler, and other additives, if desired, are worked on a roll mill or other mixing device until fair uniformity is attained. The tackifying resin is dissolved in a volatile organic solvent that also acts as a softening agent for the rubber. An emulsion of water, methyl cellulose and the resin solution is made by mixing the ingredients and stirring, preferably with a power operated stirrer, or by passing through a colloid mill. The emulsion is added in small increments to the rubber-filler mixture in a Baker-Perkins mixer. The heat generated by the mixing is usually sufficient to evaporate the resin solvent. If necessary, more water is added to cause an inversion of phase.

As in all previous methods, the temperature is held below the gelation point of the methyl cellulose before the phase inversion takes place. All the methyl cellulose can be added in emulsion form or part of the dry cellulose ether can be milled into the rubber-filler mixture and the remainder used to form a resin-organic solvent-water emulsion.

These examples show that there are numerous ways of incorporating the methyl cellulose into the rubbery polymer to effect a dispersion of the latter in water, and that regardless of the method of incorporating the cellulose ether, a stable water dispersion of rubber is formed.

In instances wherein waxed, oiled or enamel coated sheet metal is used for can end stock, the addition of small amounts of ammonia solution or amine soap after dispersion is advantageous to aid in wetting the surfaces of the metal during deposition of the compound on the can end. This, however, is not essential to a successful application of the material.

In can sealing gaskets or compounds, fillers and resins are generally employed to enhance the properties and/or reduce the cost of the compound per unit. The proportions of the ingredients that may be used is tabulated below.

In Table I the preferred and practical ranges of rubbery polymer, tackifying resin and methyl cellulose are delineated.

*Table I*

| Type of Rubber | Preferred Range, percent by wt. of solids | Practical Range, percent by wt. of solids | Tackifying Resin | Preferred Range, percent by wt. of solids | Practical Range, percent by wt. of solids | Methylcellulose (100–1500 cps.) Preferred Range, percent by wt. of solids | Methylcellulose (100–1500 cps.) Practical Range, percent by wt. of solids |
|---|---|---|---|---|---|---|---|
| Natural | 30–50 | 20–75 | Zinc Resinates / B-Pinene Polymer / Coumarone-Indene Polymer | 25–50 / 25–35 / 25–35 | 0–78 / 0–78 / 0–78 | 3–8 | 2–15 |
| Butadiene-Styrene Copolymer | 30–50 | 20–75 | Zinc Resinates / B-Pinene Polymer / Coumarone-Indene Polymer | 25–50 / 25–35 / 25–35 | 0–78 / 0–78 / 0–78 | 3–8 | 2–15 |
| Neoprene | 50–70 | 30–80 | Zinc Resinates / B-Pinene Polymer / Coumarone-Indene Polymer / Phenol cashew nut oil resin | 25–50 / 25–35 / 25–35 / 10–30 | 0–68 / 0–60 / 0–60 / 0–60 | 4–8 | 2–13 |
| Butylene and Isobutylene Polymers | 40–60 | 30–80 | Zinc Resinates / B-Pinene Polymer / Coumarone-Indene Polymer | 25–35 / 20–30 / 20–30 | 0–68 / 0–68 / 0–68 | 1.25–10 | 1–15 |
| Butadiene Acrylonitrile Copolymers and Butadiene Styrene Acrylonitrile Copolymers | 25–45 | 20–75 | Zinc Resinates / B-Pinene Polymer / Coumarone-Indene Polymer / Phenol cashew nut oil resin | 25–45 / 5–25 / 5–25 / 10–30 | 0–60 / 0–60 / 0–60 / 0–60 | 2–7 | 2–13 |

The optimum percentages of zinc oxide as a filler for can sealing compounds ranges between about 4% to about 40% and the practical range is 0% to 70%. Clays, calcium carbonate, diatomaceous earth and other non-reinforcing fillers are used in slightly smaller amounts, so that the optimum range is from about 5% to about 25% and the practical range is from 0% to 60%, regardless of the type of rubber used.

The mechanism of the formation of the dispersions is not definitely known, but it is believed to occur in the following manner. Upon blending all the ingredients, including the rubber solvent and excepting water, the rubber is softened or swelled by the organic solvent, which also wets most of the remaining ingredients. The addition of each aliquot of water results in a momentary dispersion of solids of large particle size in water. Within a short while the water is absorbed or emulsified into the solids so that a water-in-rubber emulsion or dispersion is formed. At least a portion of each aliquot of water is available for forming a methyl cellulose solution, which seems to be a very powerful dispersing agent for rubber. The continued mixing and water addition causes the methyl cellulose solution to become thoroughly mixed throughout the entire mass of materials and also forms an increasingly larger volume of methyl cellulose solution. The mixing action reduces the particle size and as the diminution occurs the methyl cellulose layer is formed on the particle of smaller dimension. The slow, cautious addition of water results in a series of temporary phase inversions. Eventually, when a water content of 18% to 23% is reached, the volume of moisture is greater than that which can be emulsified or dispersed by the rubber. At this stage, the individual particles of rubber are approximately of colloidal dimensions and are coated with methyl cellulose solution, so that on the addition of more water to the mixture the dispersion of rubber in water is completed. The compound is in paste form and in some instances has a considerable amount of rubber having a particle size too great to remain in suspension. Further slow additions of water with mixing further breaks down the particle size of the rubber and results in a composition in which the rubber remains in suspension with remarkably little sedimentation on standing. When this stage has been reached the compound can be readily diluted to lining concentration by the addition of more water. The liquid lining compound may be strained and transferred to the lining equipment or it may be packed for storage.

The compound is applied to container ends in liquid form and then may be air dried or subjected to slightly elevated temperatures up to 190° F.

Our compositions are remarkably easily inverted by slight pressure which converts the gasket from a dispersion to a continuous film of rubbery material in the seaming operation.

In preparing these gasket or lining compositions we have found that dispersions with the finest particles size are formed when the phase inversion occurs at a solids concentration of about 77% to 82%. If the solids content is much higher the composition fails to invert in phase and if they are much lower the particle size is sufficiently great to cause considerable sedimentation on standing.

Specific formulations showing exemplary compositions formed by the methods described follow:

| Ingredients | Percent by weight in dry film | Percent by weight in liquid compound |
| --- | --- | --- |
| Butadiene-Styrene Copolymer | 37.66 | 13.19 |
| Buca Clay | 14.00 | 4.89 |
| Zinc Resinate | 42.20 | 14.77 |
| Titanium Oxide | 1.57 | .56 |
| Methyl Cellulose (400 cps.) | 4.12 | 1.44 |
| Antioxidant | .37 | .13 |
| Carbon black | .08 | .02 |
| Water | | 65.00 |
| | 100.00 | 100.00 |

Natural rubber can be substituted for the butadiene-styrene copolymer of the above formula.

| | |
| --- | --- |
| Butylene and isobutylene polymers | 47.8 |
| Buca clay | 43.1 |
| Titanium dioxide | 4.8 |
| Methyl cellulose (400 cps.) | 4.3 |
| | 100.0 |

| | |
| --- | --- |
| Neoprene | 58.0 |
| Buca clay | 17.4 |
| Phenol-cashew nut shell oil resin | 11.6 |
| Curing agent | 7.3 |
| Methyl cellulose (400 cps.) | 5.7 |
| | 100.0 |

The curing agent consists of a mixture of 25 parts zinc oxide, 20 parts magnesium oxide, 10 parts phenyl-beta-napthylamine, 2.5 parts of di-ortho-tolylguanidine salt of di-catechol borate, 2.5 parts of stearic acid and 3 parts of hexamethylene tetramine.

| | |
| --- | --- |
| Butadiene-acrylonitrile copolymer | 30.2 |
| Thiokol LP2 | 9.0 |
| Phenol-cashew nut shell oil resin | 25.1 |
| Buca clay | 22.6 |
| Titanium dioxide | 7.6 |
| Antioxidant | 0.9 |
| Methyl cellulose (400 cps.) | 4.6 |
| | 100.0 |

Thiokol LP2 is a normally liquid polythio polymercaptan. A butadiene-styrene-acrylonitrile copolymer can be substituted for the butadiene-acrylonitrile copolymer of the above formula.

In actual application the compounds are liquids which contain from 25% to 50% by weight of solids dispersed in 50% to 75% by weight of water. For most purposes a compound consisting of 30-35% solids and 65-70% water is used.

The rubbery polymer content can vary from about 25% to about 60%, the tackifying resin between 50% and 125%, based on the rubber content, and filler and other additives making up the remainder of the composition. The preferred range of rubbery polymer is from 30% to 45% of the solids and that of resin is about a ratio of 1:1 to the rubber.

The composition can also be used as a coating material for paper, cloth or metal articles where a resistance to moist heat and fatty materials is a requisite.

It is thought that the invention and many of its attendant advantages will be understood from the foregoing description, and it will be apparent that various changes may be made in the matter of the ingredients, their identity and their proportions or in the methods of compounding without departing from the spirit and scope of the invention or sacrificing all of its material advantages, the form hereinbefore described being merely a preferred embodiment thereof.

We claim:

1. A moist heat and fat resistant compound consisting of from about 25% to about 40% by weight of a rubbery polymer selected from the class consisting of natural rubber, polymers of butylene, polymers of isobutylene, polymers of chloroprene, copolymers of butadiene and styrene, copolymers of butadiene and acrylonitrile and copolymers of butadiene styrene and acrylonitrile, from about 25% to about 40% by weight of a tackifying resin selected from the class consisting of zinc resinates, B-pinene polymers, coumarone-indene polymers and liquid, heat and catalyst convertible phenol-aldehyde, phenol-cashew nut shell oil and aldehyde-cashew nut shell oil polymers, from about 3% to about 8% by weight of methyl cellulose as the substantially sole water soluble dispersing agent in said compound and the remainder being a filler.

2. The composition of claim 1, dissolved and dispersed in an aqueous medium.

3. The composition of claim 2 in which water constitutes from about 50% to 75% by weight of the finished material.

4. The composition of claim 2 in which water constitutes from about 65% to 70% by weight of the finished compound.

5. A moist heat and fat-resistant compound comprising from about 25% to about 60% by weight of a rubbery polymer, a tackifying resin selected from the group consisting of a zinc resinate, a beta-pinene polymer, a coumarone-indene polymer, and a normally liquid, heat and a catalyst-convertible phenol-aldehyde, phenol-cashew nut oil and aldehyde-cashew nut oil polymer in an amount equal to about .50 to about 1.25 the weight of rubbery polymer, and from about 1% to about 15% by weight of methyl cellulose as the substantially sole water soluble dispersing agent in said compound.

6. A moist heat and fat resistant compound comprising from about 25% to about 40% by weight of a rubbery polymer, a tackifying resin selected from the group consisting of a zinc resinate, a beta-pinene polymer, a coumarone-indene polymer, and a normally liquid, heat and a catalyst-convertible phenol-aldehyde, phenol-cashew nut oil and aldehyde-cashew nut oil polymer in an amount equal to .75 to 1.0 the weight of rubbery polymer, and from about 1% to about 15% by weight of methyl cellulose as the substantially sole water soluble dispersing agent in said compound.

References Cited in the file of this patent

UNITED STATES PATENTS

| Number | Name | Date |
|---|---|---|
| 2,076,781 | Jacobsen | Apr. 13, 1937 |
| 2,370,057 | Mack | Feb. 20, 1945 |
| 2,389,796 | Mack | Nov. 27, 1945 |
| 2,427,618 | Nagle et al. | Sept. 16, 1947 |